(12) United States Patent
Vannier et al.

(10) Patent No.: US 7,978,038 B2
(45) Date of Patent: Jul. 12, 2011

(54) ELECTROMAGNETIC ACTUATOR WITH VARIABLE RELUCTANCE

(75) Inventors: Jean-Claude Vannier, Malakoff (FR);
Francois Dugue, Pompertuzat (FR);
Francois Roux, Gaure (FR); Isabelle Gibek, L'Union (FR); Denis Schwander, Labarthe sur Leze (FR)

(73) Assignee: Centre National d'Etudes Spatiales (C.N.E.S.), Paris (FR)

( * ) Notice: Subject to any disclaimer, the term of this patent is extended or adjusted under 35 U.S.C. 154(b) by 116 days.

(21) Appl. No.: 12/599,648

(22) PCT Filed: May 7, 2008

(86) PCT No.: PCT/FR2008/000642
§ 371 (c)(1),
(2), (4) Date: Nov. 10, 2009

(87) PCT Pub. No.: WO2008/152237
PCT Pub. Date: Dec. 18, 2008

(65) Prior Publication Data
US 2010/0219919 A1    Sep. 2, 2010

(30) Foreign Application Priority Data

May 11, 2007  (FR) ..................... 07 03382

(51) Int. Cl.
*H01F 3/00* (2006.01)
(52) U.S. Cl. ..................................................... 335/281
(58) Field of Classification Search .............. 335/281; 123/476; 251/129.15–129.22; 239/585.1–585.5
See application file for complete search history.

(56) References Cited

U.S. PATENT DOCUMENTS

| 5,207,410 | A  | 5/1993  | Wakeman        |
|-----------|----|---------|----------------|
| 2001/0030307 | A1 | 10/2001 | Bergstrom et al. |
| 2008/0092854 | A1 | 4/2008  | Grundl et al.  |

FOREIGN PATENT DOCUMENTS

| DE | 19924673    | 11/2000 |
| DE | 19924813    | 12/2000 |
| DE | 102004032229 | 1/2006 |
| EP | 0795881     | 9/1997  |
| EP | 1250526     | 10/2002 |
| GB | 2201039     | 8/1988  |
| WO | 9106109     | 5/1991  |
| WO | 0146581     | 6/2001  |

OTHER PUBLICATIONS

International Search Report dated Nov. 10, 2008, in PCT application.

*Primary Examiner* — Ramon M Barrera
(74) *Attorney, Agent, or Firm* — Young & Thompson

(57) ABSTRACT

The invention relates to an electromagnetic actuator with variable reluctance comprising a fixed ferromagnetic armature (3) comprising at least two concentric cylinders of revolution linked by a ring nut, at least one magnetizing winding (2) arranged between said cylinders, a ferromagnetic moving armature (4) guided in reciprocating translation movements relative to said fixed armature (3), with which it defines a magnetic circuit with an air gap (20), the dimension of which varies during reciprocating translation movements of the moving armature (4), wherein said fixed armature (3) comprises at least two series of slots, a first series of slots provided radially in said outer cylinder and extending over the entire height of said outer cylinder, and a second series of slots provided radially in said outer and inner cylinders and extending only over a major part of the height of said cylinders.

20 Claims, 4 Drawing Sheets

ELECTROMAGNETIC ACTUATOR WITH VARIABLE RELUCTANCE

Figure 1:
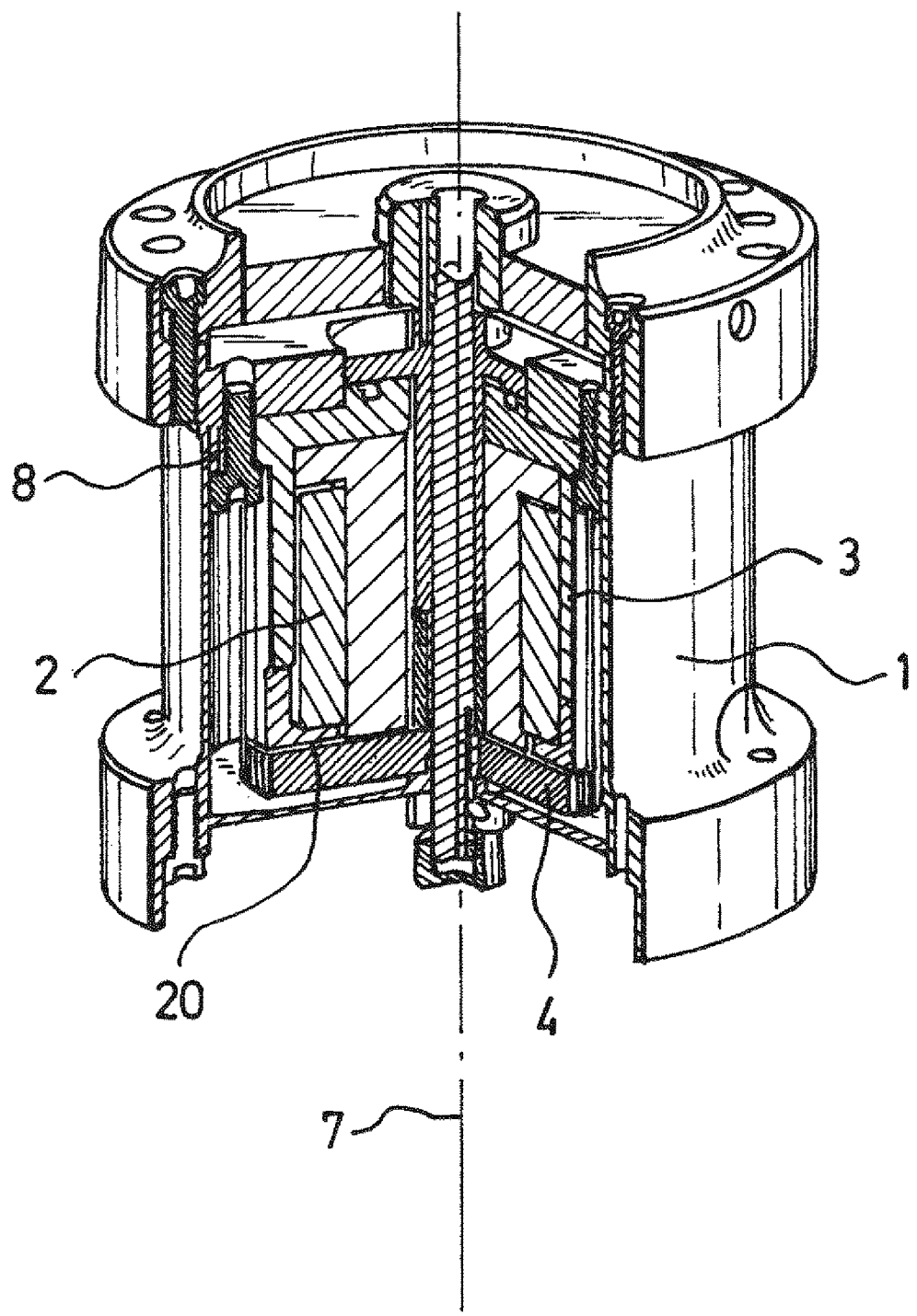

The invention relates to a linear displacement electromagnetic actuator with variable reluctance.

EP 1 250 526 describes an electric pump comprising a reciprocating actuator with variable reluctance adapted to drive a hydrazine pump for supplying a satellite propulsion system with fuel. EP 1 250 526 indicates that such an actuator is adapted to be operated at a frequency higher than 100 Hz, especially around 200 Hz.

The actuator described in EP 1 250 526 is entirely satisfactory for average delivery rates of the pump. Nevertheless, for the highest delivery rates of the pump, it is necessary for a magnetic induction flux at a high frequency of the order of 100 to 300 Hz and with a good induction level to be passed through in order to produce the necessary force for creating the pump driving force. Since ferromagnetic materials are electrically conductive, the eddy currents induced by these induction variations lead to power losses and limitation of the amplitudes of the flux variations. In order to increase the electrical resistance of the magnetic circuit, the actuator described in EP 1 250 526 proposes resorting to a lamination of the magnetic circuit (bundle of laminations insulated from one another by layers of varnish or by oxidation). This solution has various disadvantages.

A first disadvantage lies in the fact that the lamination is not well-suited to precise mechanical production. Now, in numerous applications, in particular on board a vehicle, especially on board space systems such as satellites, one is continually striving for the minimum bulk. Consequently, it is desirable to optimize the volume of the actuator, which involves very precise mechanical production.

Another disadvantage of the lamination is that it has a limited life, and may be subject to premature or poorly controlled ageing phenomena, in view of the presence of varnish. This is true in particular when the actuator is subjected to vibrations and/or is placed in an aggressive environment, for example in space. Consequently, the presence of a lamination limits the life of such an actuator and does not make it possible to guarantee a long life.

Moreover, a lamination embrittles the mechanical structure of the actuator and does not permit precision machining, thereby preventing especially the production of very small air gaps. Consequently, such an actuator cannot be used at full power, in particular with a small air gap, both owing to the risks of incipient cracking and surface irregularities.

It has been proposed, for example in EP 1 250 526 and U.S. Pat. No. 4,673,163, to resort to an actuator comprising solid armatures provided with at least one radially extending slot so as to oppose the propagation of the eddy currents.

This solution makes it possible to overcome the disadvantages of the lamination. However, the energy losses in the armatures, especially those induced by the propagation of the eddy currents, are then too great to permit the development of sufficient forces, and therefore render such an actuator incompatible with numerous applications, especially on board vehicles, in particular space vehicles.

The actuators of the prior art underline the fact that a lamination produces two a priori contradictory phenomena. On the one hand, a lamination makes it possible to limit the energy losses, thereby helping to ensure the development of a sufficient force; but on the other hand, it reduces the mechanical strength of the actuator.

Consequently, until now, it has been necessary to make a choice between an actuator which is strong but whose efficiency and power density are limited by relatively high eddy current losses, and an actuator which has small eddy current losses but whose power density is limited by the low mechanical strength of the armatures.

The object of the invention is to provide an electromagnetic actuator which makes it possible to overcome these disadvantages.

To this end, the invention is aimed at an electromagnetic actuator with variable reluctance capable of developing large forces per unit of volume or mass of the actuator—especially larger than the known actuators—and in which the eddy current losses are low.

The invention is also aimed at proposing an electromagnetic actuator suitable for use in applications on board vehicles for travelling on land and/or in water and/or air and/or space.

The invention is also aimed at proposing such an electromagnetic actuator which is compact and lightweight.

The invention is also aimed at proposing an electromagnetic actuator which is suitable for developing large forces, especially forces of the order of 150 to 250 N for a stroke of approximately 1 mm, and can have a volume less than 150 $cm^3$, in which the hysteresis losses are reduced—especially not significant.

To achieve this, the invention relates to an electromagnetic actuator with variable reluctance comprising:
  an armature body,
  a ferromagnetic armature fixed to said actuator body, called the fixed armature, comprising at least two concentric cylinders of revolution, called the inner cylinder and the outer cylinder respectively, spaced radially from one another and extending along an axis, called the actuator axis, said inner cylinder and outer cylinder being connected by a connecting ring extending in a plane orthogonal to said actuator axis,
  at least one magnetizing winding arranged between said inner cylinder and outer cylinder,
  at least one ferromagnetic movable armature arranged facing one axial end of said fixed armature, called the air-gap end, each movable armature being guided in reciprocating translation movements relative to said fixed armature along said actuator axis, with which fixed armature it defines a magnetic circuit with an air gap, the dimension of which varies during the reciprocating translation movements of this movable armature relative to the fixed armature,
wherein said fixed armature comprises at least two series of slots, a first series of slots provided radially in said outer cylinder and extending over the entire height of said outer cylinder, and a second series of slots provided radially in said outer cylinder and inner cylinder and extending only over a part of the height of said cylinders from each air-gap end, so that non-slotted portions of the fixed armature are remote from each air gap, each slot of said second series of slots being interposed between two slots of said first series of slots.

The inventors have ascertained that an actuator having such a structure, which at first sight may appear to be extremely brittle, is in fact very strong, and at all events sufficiently strong to endure repeated stresses so as to be able to utilize all the electrical power available. The double series of slots makes it possible to increase, as with a lamination, the electrical resistance of the magnetic circuit through which pass the currents induced by the induction variations, thereby making it possible to prevent the propagation of the eddy currents. On the other hand, in contrast to the lamination, these slots are made directly out of the solid, for example by electroerosion, thereby making possible precision mechanics and above all preserving the mechanical integrity of the fixed armature. The construction with a double series of slots, one series of which extends completely over the entire height of the outer cylinder, means that the slots extend practically in all the areas through which magnetic flux flows and that in the non-slotted portions, of which there are very few, there is substantially no flow of magnetic flux. At least one series of slots does not extend completely over the entire height of the cylinders so as to be able to form a non-slotted portion which makes it possible to hold together the general structure of the armature. This non-slotted portion is arranged opposite the air gap.

Advantageously and according to the invention, said first series of slots of said fixed armature extends also over a radial portion of said connecting ring, over its entire height.

The inventors have also ascertained that it is possible to provide slots in the said connecting ring connecting the inner and outer cylinders of the fixed armature without however embrittling the armature appreciably. Such a solution proves particularly effective given that the fixed armature thus has slots which extend in all the areas through which the magnetic flux flows, with the exception only of an armature portion arranged opposite the air gap.

Advantageously and according to the invention, said second series of slots of said fixed armature extends also radially only over a part of the height of said connecting ring.

Such a structure makes it possible to provide a fixed armature which comprises slots in all the areas where the magnetic flux flows, with the exception of a central portion of the connecting ring delimited radially by an inner wall of the inner cylinder and the radial end of the slots of the first series of slots and longitudinally along said actuator axis by an end of the connecting ring and the end of the slots of the second series of slots opposite the air gap. It should be noted, furthermore, that this non-slotted portion of the connecting ring is arranged at a distance from each air gap of the magnetic circuit.

The connecting ring connecting the inner and outer cylinders may be arranged in any plane orthogonal to the actuator axis between the axial ends of the cylinders of the fixed armature. In particular, in the case where the actuator comprises two movable armatures arranged respectively facing each of the axial ends of the fixed armature, this connecting ring is advantageously arranged so that it extends in the mid-plane of the inner and outer cylinders orthogonal to the actuator axis. In the most common case where the actuator comprises a single movable armature facing one axial end of the fixed armature with which it forms a magnetic circuit with a single air gap, the connecting ring connecting the inner and outer cylinders preferably extends in a plane arranged at the axis end opposite the air gap.

Thus, advantageously, an actuator according to the invention comprises a single movable armature arranged facing one axial end of said fixed armature, called the air-gap end, with which it defines a magnetic circuit with a single air gap, said inner cylinder and outer cylinder of said fixed armature being connected by said connecting ring at the axial end opposite said air-gap end.

In this case, the non-slotted portion of the connecting ring is arranged at one axial end of the fixed armature.

This non-slotted central portion ensures that the slotted inner and outer cylinders are mechanically held together.

The slots of the second series of slots of the fixed armature may extend axially to a greater or lesser extent in the inner and outer cylinders from the air-gap end. The length of the slots along said actuator axis may be optimized in order to limit the propagation of the eddy currents on the one hand, and to preserve the mechanical integrity of the fixed armature on the other hand.

Advantageously and according to the invention, each slot of each series of slots extends parallel to said actuator axis.

Advantageously and according to the invention, each slot of said second series of slots of said fixed armature extends over more than 80% of the height of the inner cylinder and outer cylinder.

This relationship between the length of the cylinders and the length of the slots of the second series of slots makes it possible to ensure that the non-slotted portions of the armature do not constitute more than 20% of the total armature.

Advantageously and according to the invention, at least one movable armature—especially each movable armature—is discoid and has at least one series of radial slots provided only over a radial part of this armature over the entire height of this movable armature.

As with the fixed armature, the inventors have ascertained that a movable armature may, in combination with the fixed armature, have at least one series of slots provided only over a radial part of the movable armature without however embrittling the armature. The cuts making it possible to create the slots are advantageously produced by electroerosion.

Advantageously and according to the invention, each slot of said first series of slots of at least one movable armature—especially each movable armature—extends radially over more than 30% of the radius of the movable armature.

A movable armature may comprise one or more series of slots.

Advantageously and according to the invention, at least one movable armature—especially each movable armature—comprises at least one second series of slots provided only over a radial part of this movable armature over the entire height of this movable armature, each slot of said second series of slots of this movable armature extending radially over more than 60% of the radius of this movable armature.

Advantageously and according to the invention, at least one movable armature—especially each movable armature—comprises at least one third series of slots provided only over a radial part of this movable armature over the entire height of this movable armature, each slot of said third series of slots of this movable armature extending radially over more than 75% of the radius of this movable armature.

Such an actuator thus has a similar electromagnetic performance to that of an actuator having a lamination, or even better, and a similar mechanical performance to that of a solid actuator. On the other hand, it has a markedly superior mechanical performance to that of an actuator having a lamination and a markedly superior electromagnetic performance to that of a solid actuator. An actuator according to the invention may thus have optimized dimensions, a weight and life compatible with on-board, especially space, applications. An actuator according to the invention can generate a power per unit of volume and/or mass which is markedly greater than the actuators of the prior art, and has optimum energy efficiency.

The fixed armature according to the invention is an armature preferably produced by electroerosion which has two concentric cylinders between which the magnetizing winding is accommodated. Likewise, the movable armature is discoid and preferably produced by electroerosion.

Advantageously and according to the invention, at least one movable armature—especially each movable armature—is discoid and has a diameter substantially equal to the diameter of said outer cylinder of said fixed armature.

The armatures of an actuator according to the invention may be produced from any type of ferromagnetic material. It is known that in the context of a magnetic circuit subjected to a high-frequency magnetic field, the hysteresis losses are limited by the use of materials with a narrow loop, such as nanocrystalline materials. The armatures of an actuator according to the invention may also be produced from soft iron, XC 10 steel, AISI 430, any type of metal alloys, etc. Nevertheless, experiments have shown that the magnetic losses generated by the use of some of these materials, especially soft iron, may be considerable.

Thus, advantageously and according to the invention, said fixed armature is produced from an iron-nickel alloy comprising iron and nickel in substantially identical proportions. This is an alloy with very low hysteresis combined with a relatively high saturation induction. It has a relative initial permeability of 7500.

Likewise, a movable armature may also be produced from any type of material. Nevertheless, advantageously and according to the invention, at least one movable armature—especially each movable armature—is produced from an iron-nickel alloy comprising iron and nickel in substantially identical proportions.

Various types of windings may be used in an actuator according to the invention. The number of turns of these windings, the section of each turn and the supply of these windings depend on the envisaged use.

An actuator according to the invention may, for example, be used to drive a fuel pump for supplying a satellite propulsion system. For this, the inventors have ascertained the volumes and sections of the actuator which make it possible to optimize the bulk of the actuator for a given pump and performance. All of the dimensions are derived, on the one hand, from the diameter of the rod of the pump to be driven and, on the other hand, from the force to be developed by the operation of the pump.

Advantageously and according to the invention, the thickness of at least one movable armature—especially each movable armature—is substantially equal to the thickness of said connecting ring connecting said inner cylinder and said outer cylinder.

The slots provided in the different armatures may have different dimensions. The latter must make it possible to limit the eddy currents while maintaining the mechanical integrity of the armatures.

Advantageously and according to the invention, for each of the fixed armature and movable armature, the slots are made so that each armature portion between two adjacent slots, called the armature lamina, has dimensions adapted so that the first natural bending mode of this lamina is of a frequency greater than the operating frequency of the actuator.

The use frequencies of an actuator according to the invention are of the order of 100 Hz to 300 Hz. Consequently, the dimensions of the armature laminas are determined so that the first natural bending modes on the axis of smallest inertia and of largest inertia are of the order of 1000 Hz and more than 3000 Hz, respectively.

The distribution of the slots in the armatures may change from one application to another.

Nevertheless, advantageously and according to the invention, for each of the fixed armature and movable armature, said slots are uniformly distributed over the entire periphery of this armature.

The angular displacement between two slots may be adapted for each application, depending on the mechanical and magnetic stresses pursued.

Nevertheless, advantageously and according to the invention, two adjacent slots of said outer cylinder are separated angularly by at least 3°, especially 3.75°.

The inventors have ascertained that this distribution of the slots makes it possible to limit the eddy currents while maintaining the mechanical integrity of the outer cylinder of the fixed armature.

Likewise, advantageously and according to the invention, two adjacent slots of at least one movable armature—especially each movable armature—are separated angularly by at least 3°, especially 3.75°.

The width of each of the slots may be chosen according to the intended application.

Nevertheless, advantageously and according to the invention, each slot has a width of at least 0.3 mm, especially 0.37 mm.

The inventors have ascertained that such slots make it possible to limit the eddy currents while maintaining the mechanical integrity of the armatures.

An electromagnetic actuator according to the invention has an axisymmetric magnetic circuit, thereby making it possible to use the entire electromagnetic field generated by a cylindrical coil provided between the inner and outer cylinders of the fixed armature of this actuator.

Furthermore, an actuator according to the invention makes it possible to withstand large thermal differences without generating thermoelastic stresses. In particular, an actuator according to the invention can withstand thermal shocks, thereby allowing the use of such an actuator over wide temperature ranges. Consequently, an actuator according to the invention may be borne on board a variety of vehicles, for travelling on land and/or in water and/or air and/or space, intended to move about in various conditions without requiring specific modification of the structure of the actuator, nor adaptation of the environment within which the actuator is placed.

The invention further relates to an electromagnetic actuator with variable reluctance characterized in combination by all or part of the features mentioned above or below.

Figure 3:
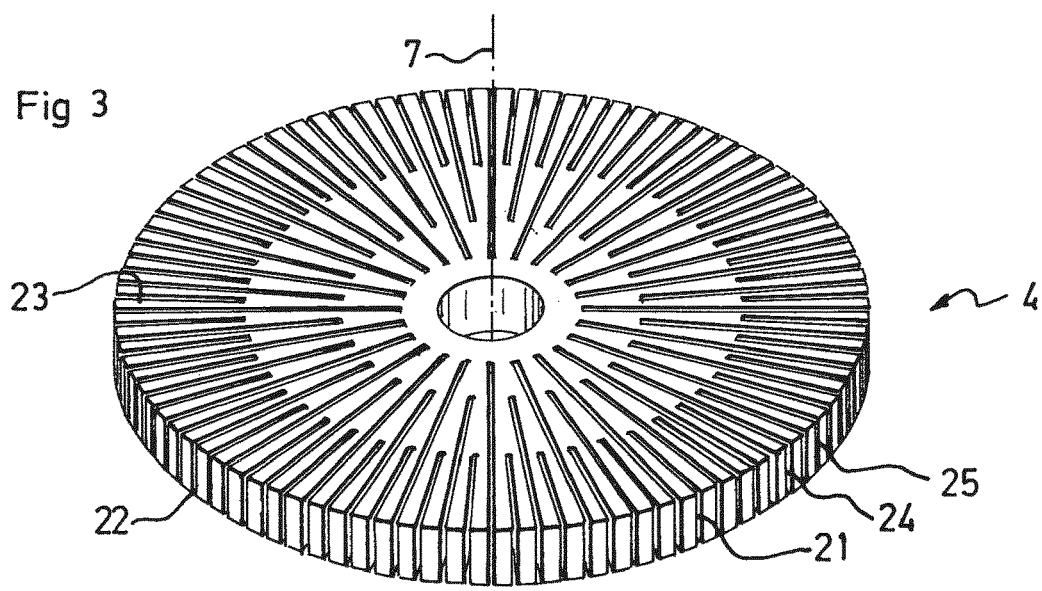
Figure 2:
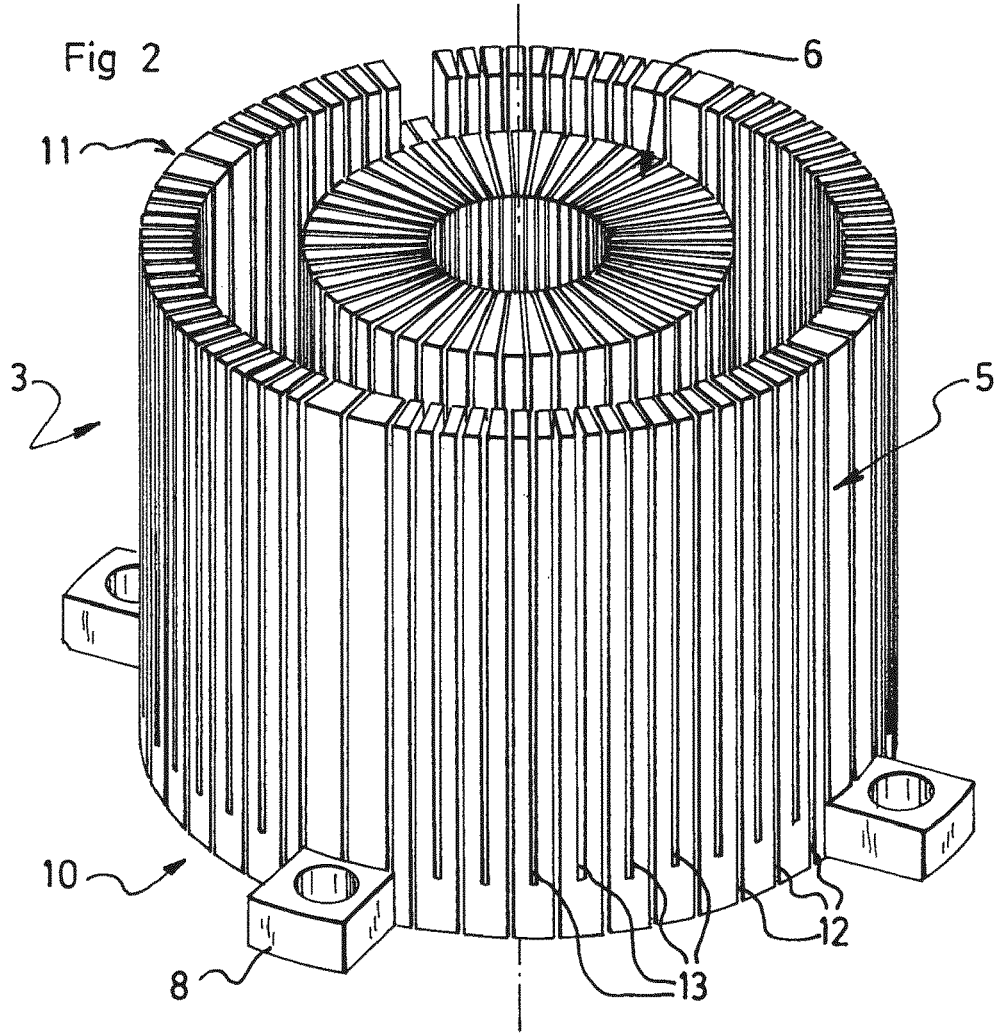
Figure 4:
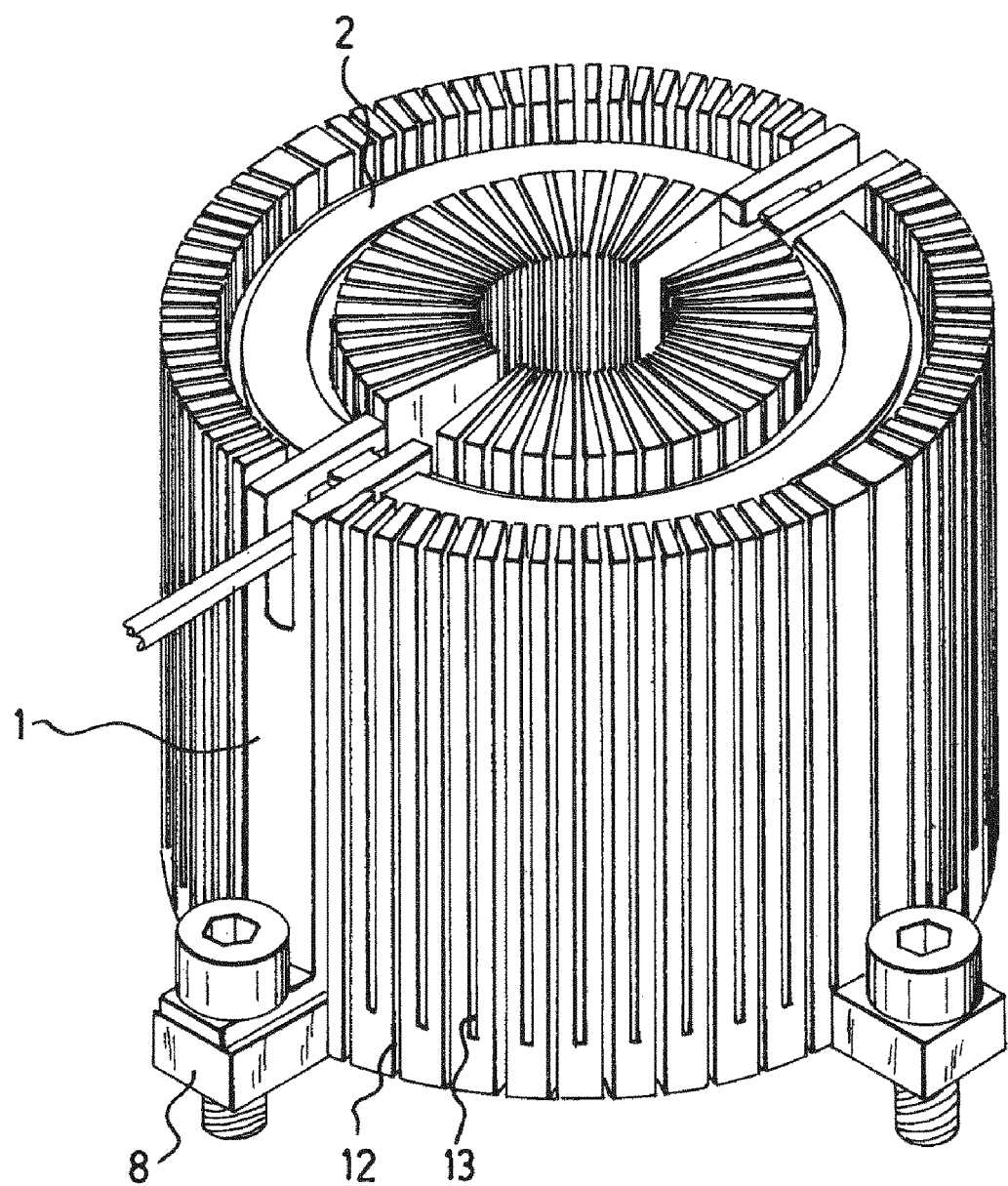
Figure 5:
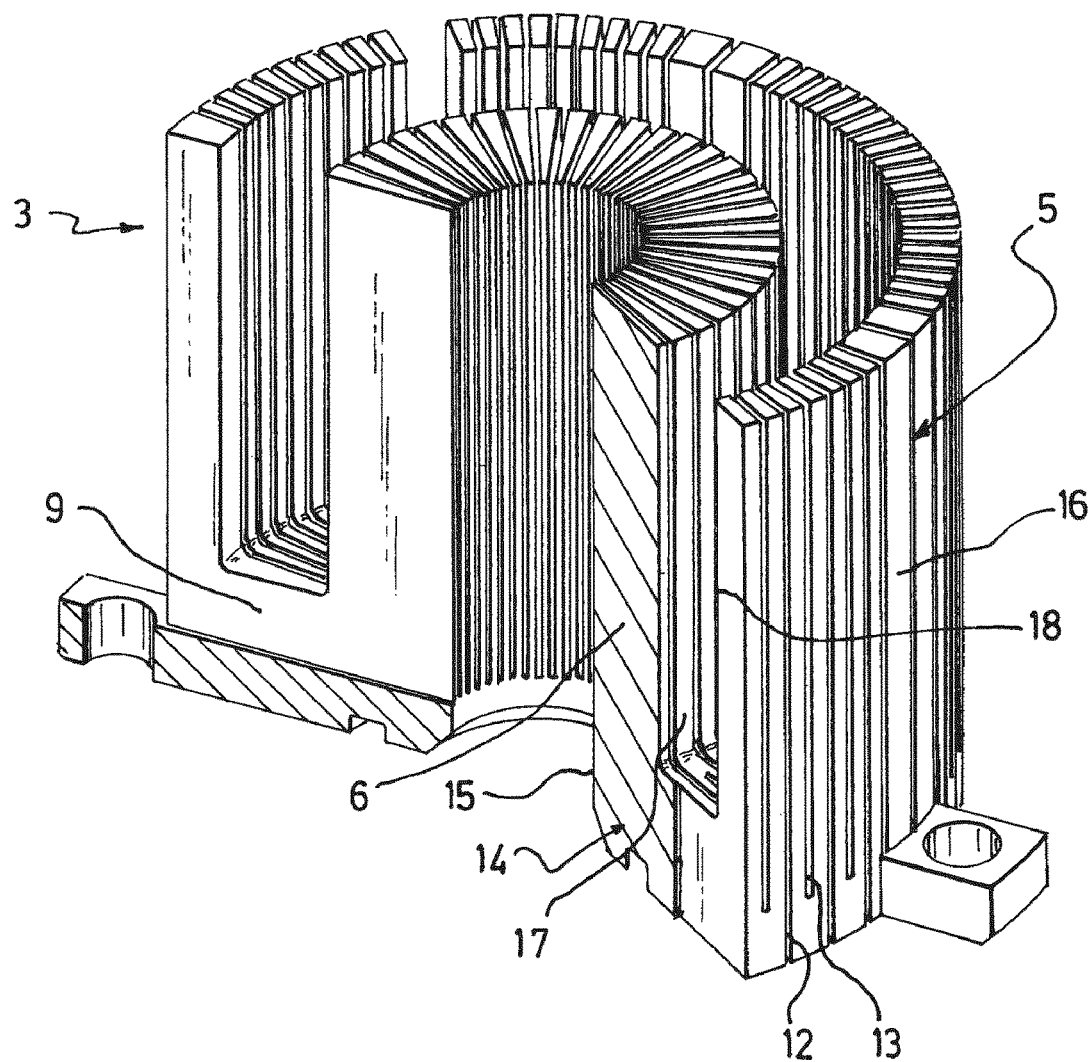

Further features, objects and advantages of the invention will become apparent on reading the following description which presents one embodiment of the invention by way of non-limiting example, with reference to the appended drawings; in these drawings:

FIG. 1 is a schematic perspective view of an actuator according to one embodiment of the invention, FIG. 2 is a schematic perspective view of a fixed armature of an actuator according to one embodiment of the invention, FIG. 3 is a schematic perspective view of a movable armature of an actuator according to one embodiment of the invention, FIG. 4 is a schematic perspective view of a fixed armature of an actuator according to one embodiment of the invention bearing a magnetizing winding, FIG. 5 is a schematic longitudinal-sectional view, with intersecting planes, of the fixed armature of FIG. 2.

An electromagnetic actuator with variable reluctance according to the invention comprises, as shown in FIG. 1, an actuator body 1, a magnetic core and a magnetizing winding 2. The magnetic core comprises an armature 3 fixed to the actuator body 1 via fixing lugs 8 and an armature 4 movable relative to the fixed armature 3. The fixed armature 3, the movable armature 4 and the magnetizing winding 2 forms a magnetic circuit with air gap 20, the dimension of which varies by displacement of the movable armature 4 relative to the fixed armature 3.

The fixed armature 3 comprises according to the invention, and as shown especially in FIG. 2, at least two concentric cylinders of revolution spaced radially from one another, an outer cylinder 5 and an inner cylinder 6. The outer cylinder 5 and inner cylinder 6 extend along an axis, called the actuator axis 7. This actuator axis 7 corresponds to the axis of guidance in reciprocating translation movements of the movable armature 4 relative to the fixed armature 3. The outer cylinder 5 and inner cylinder 6 are connected at one of their axial ends, called the connecting end 10, by a connecting ring 9.

According to the embodiment in the figures, the actuator comprises a single movable armature 4 arranged facing one axial end of the outer cylinder 5 and inner cylinder 6, called the air-gap end 11, opposite the connecting end 10 where the connecting ring 9 extends.

Nevertheless, according to other embodiments of the invention, an actuator may comprise two movable armatures arranged facing each of the axial ends of the fixed armature, thus defining two air gaps. According to this embodiment, the connecting ring preferably extends in the vicinity of a midplane of the fixed armature, arranged midway between the two air gaps.

Preferably, the lugs 8 for fixing the fixed armature 3 on the actuator body 1 extend in a plane orthogonal to said actuator axis 7 which comprises at least partly the connecting ring 9.

It should be noted that the fixed armature as shown in FIGS. 2, 4 and 5 is inverted relative to its representation in FIG. 1.

The inner cylinder 6 comprises an inner wall 15 and an outer wall 17. The outer cylinder 5 comprises an inner wall 18 facing the outer wall 17 of the inner cylinder 6 and spaced from this outer wall, and an outer wall 16.

The magnetizing winding 2 of an actuator according to the invention is arranged between the outer wall 17 of the inner cylinder 6 and the inner wall 18 of the outer cylinder 5. Any type of winding may be used for the production of an actuator according to the invention. For example, the winding may be a coil of 168 turns made of wire of 0.9 mm designed to operate at 50 V or a coil of 328 turns made of wire of 0.56 mm designed to operate at 100 V. Of course, other types of winding may be used according to the type of application pursued. FIG. 4 shows a winding 2 according to the invention accommodated between the inner cylinder 6 and outer cylinder 5 of the fixed armature 3 according to the invention.

According to the invention, the fixed armature 3 comprises a first series of slots 12 provided radially in the outer cylinder 5, each slot 12 opening onto the inner wall 18 and onto the outer wall 16 of the outer cylinder 5. Furthermore, each slot 12 extends over the entire height of the outer cylinder 5 parallel to the actuator axis 7. Each slot thus extends in a radial plane. The outer cylinder 5 is therefore completely cut up by the first series of slots 12. The slots 12 are advantageously uniformly distributed over the outer cylinder 5. The number of slots 12 depends on the diameter of the cylinder 5 and the application for which the actuator is intended. According to the embodiment in the figures, two adjacent slots 12 are separated by an angle of 7.5°. Of course, according to other embodiments, the slots 12 may be separated by an angle greater or less than the aforementioned angle. Since each slot is preferably produced by electroerosion, it has a constant width.

According to the embodiment in the figures, the fixed armature 3 also comprises a second series of slots 13 provided radially jointly in the outer cylinder 5 and inner cylinder 6. Each slot 13 extends radially from the inner wall 15 of the inner cylinder 6 to the outer wall 16 of the outer cylinder 5. However, in contrast to the slots 12 of the first series of slots, each slot 13 extends only over a portion of the height of the outer cylinder 5 and inner cylinder 6. Each slot 13 opens towards the air-gap end 11. Thus, each slot 13 is provided between the air-gap end 11 of the cylinders 5, 6 and an area in the vicinity of the connecting end 10 of the cylinders. The dimensions of the portions of the cylinders not slotted by these slots 13 depend on the intended application.

According to the embodiment in the figures, the height along the actuator axis 7 of the portions of cylinders 5 and 6 not covered by the slots 13 does not exceed 15% of the total height of the cylinders 5 and 6.

For example, the cylinders 5 and 6 may each have a height of 39 mm, the slots 12 extend over the entire height of the outer cylinder 5 and the slots 13 extend only over 33 mm of the height of the cylinders 5 and 6.

These cuts in the fixed armature 3 are preferably produced by electroerosion.

According to the embodiment in the figures, the slots 12 also extend over a radial portion of the end ring 9 over the entire height of this end ring 9, whereas the slots 13 extend radially from the inner wall 15 of the inner cylinder 6 to the outer wall 16 of the outer cylinder 5, only over a portion of the height of the end ring 9.

This construction makes it possible to ensure virtually uniform cutting of the fixed armature 3 with the exception of a non-slotted central portion 14 delimited radially by the inner wall 15 of the inner cylinder 6 and the radial end 16 of the slots 12 of the first series of slots 12, and longitudinally along said actuator axis 7, by said connecting end 10 and the end of the slots 13 of the second series of slots 13 opposite the air-gap end 11. This non-slotted central portion 14 is arranged opposite the air gap 20 of the magnetic circuit thus produced.

Each pair of immediately adjacent slots defines an armature lamina.

This non-slotted portion 14 makes it possible to maintain the mechanical integrity of the fixed armature 3 by acting as a branching area of the different laminas of the fixed armature. The inventors have ascertained that this non-slotted central portion 14 is sufficient to ensure the mechanical integrity of the fixed armature 3 so that an actuator according to the invention can operate at full power.

Furthermore, the plurality of slots 12, 13 provided in the fixed armature 3 makes it possible to increase the electrical resistance of the magnetic circuit, thereby preventing the propagation of the eddy currents. Consequently, an actuator according to the invention has excellent efficiency.

According to a particularly advantageous embodiment of the invention, the movable armature 4 is discoid.

This discoid movable armature 4 comprises, as shown in FIG. 3, a face 22 arranged facing the air-gap end 11 of the fixed armature 3, once the movable armature 4 is mounted in the actuator body 1, and a face 23 opposite the face 22 and parallel to the latter. The movable armature 4 is adapted to be driven in reciprocating translation movements along the actuator axis 7.

According to an advantageous embodiment of the invention, the movable armature 4 also comprises a plurality of series of slots.

According to the embodiment in FIG. 3, the movable armature 4 comprises three series of slots, each slot of each series of slots extending over the entire height of the movable armature 4 between its faces 23, 24. A first series of slots 21 extends only over a radial portion of the armature, from the periphery of the armature, which constitutes of the order of 33% of the radius of the movable armature 4. A second series of slots 24 extends only over a radial portion of the armature, from the periphery of the armature, which constitutes of the order of 60% of the radius of the movable armature 4. A third series of slots 25 extends only over a radial portion of the armature, from the periphery of the armature, which constitutes of the order of 75% of the radius of the movable armature 4.

According to the embodiment in FIG. 3, two pairs of successive slots 21 are arranged on either side of a slot 24 and a slot 25, respectively. Consequently, according to this embodiment, the second series of slots 24 comprises as many slots as the third series of slots 25. On the other hand, the first series of slots 21 comprises double the number of slots of the second series of slots 24 and of the third series of slots 25.

This structure makes it possible to obtain a strong movable armature 4 since the most numerous slots 21 are the shortest, that is to say those of which the cutting removes the least material from the movable armature 4. Furthermore, the armature comprises slots which extend radially over almost the entire armature so that only a small central portion of the armature through which the induction passes does not comprise slots. Such a structure thus makes it possible to have an armature in which the influence of the eddy currents is negligible while benefiting from a mechanical strength which does not limit the usable electromagnetic power.

According to the embodiment in FIG. 3, the non-slotted central portion has a radial dimension of the order of 10% of the radius of the movable armature 4.

According to this embodiment, two successive slots, regardless of the series to which they belong, are separated by an angle of 3.75°. Each pair of adjacent slots defines an armature lamina. According to the embodiment in FIG. 3, two adjacent armature laminas are separated by an angle of 3.75°.

Nevertheless, according to other embodiments, the number of series of slots, the dimensions of the slots and the arrangement of the latter may be different.

According to an embodiment of the invention, one or more slots of one or more series of slots may be filled by a resin, of the epoxy resin type, so as to increase the mechanical strength of the actuator.

The movable armature 4 has a central axial through bore in which, for example, the piston of a pump may be accommodated, so that the displacements of the movable armature 4 relative to the fixed armature 3 bring about the displacement of the piston of the pump. For this, the central axial bore has, according to the embodiment in FIG. 3, a radius of the order of 15% of the radius of the discoid movable armature 4.

According to other embodiments, the slots of the fixed armature and of the movable armature may be arranged differently and have different angular spacings.

Nevertheless, according to a particularly advantageous embodiment, the slots are made so that each armature lamina defined by an armature portion arranged between two adjacent slots has dimensions adapted so that the first natural bending mode of this lamina is of a frequency greater than the operating frequency of the actuator.

An actuator according to the invention can operate optimally at high frequencies of the order of 100 Hz to 300 Hz. Consequently, the dimensions of the armature laminas are advantageously determined so that the first bending modes on the axis of smallest inertia and of largest inertia are, for example, of the order of 1000 Hz and more than 3000 Hz, respectively.

For this, and as shown in FIGS. 2 and 5, the laminas of the outer cylinder 5 of the fixed armature 3 which are defined by a pair of slots—one slot 12 of the first series of slots and one slot 13 of the second series of slots—have a radial dimension of 3.25 mm, an angular dimension at the inner wall 18 of 1 mm and an angular dimension at the outer wall 16 of 1.25 mm. The height of such a lamina is defined by the height of the slots which, as seen above, is 33 mm according to the embodiment in FIGS. 2 and 5.

According to the embodiment in FIGS. 2 and 5, the laminas of the inner cylinder 6 of the fixed armature 3 which are defined by a pair of slots 13 of the second series of slots have a radial dimension of 8.25 mm, an angular dimension at the inner wall 15 of 0.25 mm and an angular dimension at the outer wall 17 of 1.5 mm. The height of such a lamina is defined by the height of the slots which, as seen above, is 33 mm according to the embodiment in FIGS. 2 and 5.

Of course, other dimensions make it possible to obtain laminas whose natural bending mode is greater than the operating frequency of the actuator. These dimensions are advantageously determined by simulation.

An actuator according to the invention may also be designed to operate outside the frequency range of 100 Hz to 300 Hz.

An actuator according to the invention may be produced from various types of materials, such as stainless steel, XC 10 steel, soft iron, nanocrystalline materials, metal alloys, etc.

According to a particularly advantageous embodiment of the invention, the magnetic core is produced from an iron-nickel alloy comprising substantially identical proportions of iron and nickel.

The reason for this is that a metal alloy has a very low hysteresis combined with a relatively high saturation induction.

Moreover, such an iron-nickel alloy provides a low remanent induction level. Consequently, in contrast to what happens especially with actuators comprising iron armatures, a movable armature produced with such an iron-nickel alloy does not adhere to the fixed armature in the absence of a current in the magnetizing winding. In particular, it is not necessary, with an actuator according to the invention comprising armatures produced with an iron-nickel alloy in substantially identical proportions, to limit the minimum air gap of the actuator to a value of the order of a few hundredths of millimetres in order to avoid being subjected to the remanent force which would block any movement of the actuator until a sufficient force is applied. An actuator according to this embodiment thus offers great flexibility of use.

An actuator according to the invention makes it possible to develop considerable power in a small volume.

According to the embodiment in the figures, the actuator occupies a volume less than 140 cm$^3$ and makes it possible to develop more than 200 N for a stroke of 1 mm of the movable armature.

Consequently, an actuator according to the invention is particularly suitable for on-board applications for which a considerable power per unit of volume is required. An actuator according to the invention has a plurality of slots making it possible to limit the eddy currents while preserving the rigid and strong mechanical structure of the armatures. Consequently, an actuator according to the invention may be used at full electrical power without the risk of damaging the armatures. An actuator according to the invention is therefore particularly suitable for applications which involve considerable mechanical stresses.

An actuator according to the invention is not limited solely to the embodiments described. In particular, an actuator according to the invention may comprise a different number of slots, a different general construction and a different winding, without however departing from the subject matter of the present invention.

The invention claimed is:

1. Electromagnetic actuator with variable reluctance comprising:

an actuator body, a ferromagnetic armature fixed to said actuator body, called the fixed armature, comprising at least two concentric cylinders of revolution, called the inner cylinder and the outer cylinder respectively, spaced radially from one another and extending along an axis, called the actuator axis, said inner cylinder and outer cylinder being connected by a connecting ring extending in a plane orthogonal to said actuator axis, at least one magnetizing winding arranged between said inner cylinder and outer cylinder, at least one ferromagnetic movable armature arranged facing one axial end of said fixed armature, called the air-gap end, each movable armature being guided in reciprocating translation movements relative to said fixed armature along said actuator axis, with which fixed armature it defines a magnetic circuit with an air gap, the dimension of which varies during the reciprocating translation movements of this movable armature relative to the fixed armature, wherein said fixed armature comprises at least two series of slots, a first series of slots provided radially in said outer cylinder and extending over the entire height of said outer cylinder, and a second series of slots provided radially in said outer cylinder and inner cylinder and extending only over a part of the height of said cylinders from each air-gap end so that non-slotted portions of the fixed armature are remote from each air gap, each slot of said second series of slots being interposed between two slots of said first series of slots.

2. Actuator as claimed in claim 1, wherein said first series of slots of said fixed armature extends also over a radial portion of said end ring, over its entire height.

3. Actuator as claimed in claim 2, wherein said second series of slots of said fixed armature extends also radially only over a part of the height of said connecting ring.

4. Actuator as claimed in claim 2, comprising a single movable armature arranged facing one axial end of said fixed armature, called the air-gap end, with which it defines a magnetic circuit with a single air gap, wherein said inner cylinder and outer cylinder of said fixed armature are connected by said connecting ring at the axial end of said fixed armature opposite said air-gap end, called the connecting end.

5. Actuator as claimed in claim 1, wherein said second series of slots of said fixed armature extends also radially only over a part of the height of said connecting ring.

6. Actuator as claimed in claim 1, comprising a single movable armature arranged facing one axial end of said fixed armature, called the air-gap end, with which it defines a magnetic circuit with a single air gap, wherein said inner cylinder and outer cylinder of said fixed armature are connected by said connecting ring at the axial end of said fixed armature opposite said air-gap end, called the connecting end.

7. Actuator as claimed in claim 1, wherein each slot of each series of slots extends in a radial plane parallel to said actuator axis.

8. Actuator as claimed in claim 1, wherein each slot of said second series of slots of said fixed armature extends over more than 80% of the height of the inner cylinder and outer cylinder.

9. Actuator as claimed in claim 1, wherein at least one movable armature is discoid and comprises at least one first series of slots provided over a major radial part of this movable armature, over the entire height of this movable armature.

10. Actuator as claimed in claim 9, wherein each slot of said first series of slots of at least one movable armature extends radially over more than 30% of the radius of this movable armature.

11. Actuator as claimed in claim 9, wherein at least one movable armature comprises at least one second series of slots provided only over a radial part of this movable armature over the entire height of this movable armature, each slot of said second series of slots of this movable armature extending radially over more than 60% of the radius of this movable armature.

12. Actuator as claimed in claim 9, wherein at least one movable armature comprises at least one third series of slots provided only over a radial part of this movable armature over the entire height of this movable armature, each slot of said third series of slots of this movable armature extending radially over more than 75% of the radius of this movable armature.

13. Actuator as claimed in claim 9, wherein at least one movable armature has a diameter substantially equal to the diameter of said outer cylinder of said fixed armature.

14. Actuator as claimed in claim 1, wherein said fixed armature is produced from an iron-nickel alloy comprising iron and nickel in substantially identical proportions.

15. Actuator as claimed in claim 1, wherein at least one movable armature is produced from an iron-nickel alloy comprising iron and nickel in substantially identical proportions.

16. Actuator as claimed in claim 1, wherein each movable armature has a thickness substantially equal to the thickness of said connecting ring connecting said inner cylinder and said outer cylinder.

17. Actuator as claimed in claim 1, wherein for each of the fixed armature and movable armature, the slots are made so that each armature portion between two adjacent slots, called the armature lamina, has dimensions adapted so that the first natural bending mode of this lamina is of a frequency greater than the operating frequency of the actuator.

18. Actuator as claimed in claim 1, wherein for each of the fixed armature and movable armature, said slots are uniformly distributed over the entire periphery of this armature.

19. Actuator as claimed in claim 18, wherein two adjacent slots of said outer cylinder are separated angularly by at least 3°.

20. Actuator as claimed in claim 9, wherein each slot of said first series of slots of at least one movable armature extends radially over more than 30% of the radius of this movable armature;

wherein at least one movable armature comprises at least one second series of slots provided only over a radial part of this movable armature over the entire height of this movable armature, each slot of said second series of slots of this movable armature extending radially over more than 60% of the radius of this movable armature;

wherein at least one movable armature comprises at least one third series of slots provided only over a radial part of this movable armature over the entire height of this movable armature, each slot of said third series of slots of this movable armature extending radially over more than 75% of the radius of this movable armature;

wherein at least one movable armature has a diameter substantially equal to the diameter of said outer cylinder of said fixed armature;

wherein said fixed armature is produced from an iron-nickel alloy comprising iron and nickel in substantially identical proportions;

wherein at least one movable armature is produced from an iron-nickel alloy comprising iron and nickel in substantially identical proportions;

wherein each movable armature has a thickness substantially equal to the thickness of said connecting ring connecting said inner cylinder and said outer cylinder;

wherein for each of the fixed armature and movable armature, the slots are made so that each armature portion between two adjacent slots, called the armature lamina, has dimensions adapted so that the first natural bending mode of this lamina is of a frequency greater than the operating frequency of the actuator;

wherein for each of the fixed armature and movable armature, said slots are uniformly distributed over the entire periphery of this armature;

wherein two adjacent slots of said outer cylinder are separated angularly by at least 3°; and wherein for each movable armature, two adjacent slots are separated angularly by at least 3°.

* * * * *